United States Patent

[11] 3,581,773

| [72] | Inventor | Kenneth H. Warren |
| | | 1500 Jupp Road, Glenn Burnie, Md. 21061 |
| [21] | Appl. No. | 853,450 |
| [22] | Filed | Aug. 27, 1969 |
| [45] | Patented | June 1, 1971 |

[54] DEVICE FOR ATTENUATING PULSATION (DEADENER)
5 Claims, 2 Drawing Figs.

[52] U.S. Cl. ............................................ 138/26, 73/392, 73/430, 138/46
[51] Int. Cl. ............................................ F16l 55/04
[50] Field of Search ............................. 138/26, 43, 46, 45; 137/436; 73/392, 430

[56] References Cited
UNITED STATES PATENTS
| 2,593,315 | 4/1952 | Kraft | 138/45 |
| 2,808,070 | 10/1957 | Malsbary | 138/26 |
| 2,899,981 | 8/1959 | Binks | 138/46 |

Primary Examiner—Laverne D. Geiger
Assistant Examiner—Richard J. Sher
Attorneys—L. A. Miller, Q. E. Hodges, A. Sopo and R. F. Sandler ABSTRACT: A fluid pulse attenuation device or deadener which can be used for its general quieting abilities such as, for example, a filter in a feedback loop or as a device inserted between a pressure gage or similar measuring device in connection with a pipe whose contents are being measured. The device contains a number of flexible reeds which act as pulse attenuating variable orifices, resulting in a filtered, attenuated output and allowing accurate measurements when used with measuring devices.

PATENTED JUN 1 1971

3,581,773

INVENTOR.
KENNETH H. WARREN
BY
*[signatures]*
ATTORNEYS

DEVICE FOR ATTENUATING PULSATION (DEADENER)

The invention described herein may be manufactured and used by or for the Government of the United States of America for governmental purposes without the payment of any royalties thereon or therefor.

BACKGROUND OF THE INVENTION

The present invention relates to an attenuation device or deadener which may be used simply for its quieting abilities, as a filter in feedback system control loops or used with pressure gauges manometers, flowmeters and the like in order to obtain accurate measurements. More particularly, the invention relates to a new and improved deadener which provides effective attenuation of any throbbing impulses of fluid pressure.

The prior art in the area of impulse attenuation includes disc and diaphragm deadeners, surge tanks, capillaries and partially closed valves. All these devices have been less than optimum in operation. The disc and diaphragm deadeners have been too complex in design, surge tanks are too large and capillaries and valves have been found to clog too easily and are unable to accurately handle fast changes in fluid pressures.

There are, therefore, outstanding requirements for deadeners which lack complexity, are small in size, are not prone to clogging and will handle fast pressure changes while preserving accuracy. Such requirements have proved difficult to achieve in the past, however, the present invention does teach an apparatus capable of meeting these requirements.

Accordingly, it is an object of the present invention to provide a new and improved fluid pressure pulse attenuation device.

Another object is to provide an attenuation device of simple construction.

A further object of the invention is the provision of a fluid attenuation device of small size.

Still another object is to provide a fluid attenuation device which resists clogging.

A still further object is to provide an attenuation device which can handle fast changes in fluid pressure while maintaining a high degree of accuracy.

Other objects and advantages, as well as the exact nature of the invention, will be readily apparent to those skilled in the art from the consideration of the following disclosure of the invention.

SUMMARY OF THE INVENTION

The present invention accomplishes the above-cited objects by providing a deadener which is simple in its construction, small, has almost no disposition to clogging and has the capability of fast and accurate response to fast changes in pressure. This is achieved through the use of the insertion of a series of thin, flexible, flat springs or reeds in a housing fluidly coupled to a pipe containing a pulsating fluid being operated upon. More particularly, there is provided a housing forming a generally enclosed chamber containing a series of thin and flexible reeds.

The housing may be, for instance, generally rectangular and have suitable conventional connectors for allowing its adaptation. The reeds are cantilevered from the sides of the housing, are generally parallel with each other and perpendicular to the direction of fluid flow approaching the reeds. The reeds extend towards the side of the housing opposite that from which each reed is fastened and extends and approaches a stiff sharp-edged plate which is cantilevered from the opposite side. Each reed and its associated plate substantially but not completely block the fluid path through the chamber. In the case of a steady fluid flow, the reeds will bend away from the plates, the amount of deviation depending on the fluid pressure. In the case of a pulsating fluid flow, the reeds will vibrate. In either case, the individual reeds act as variable orifices as opposed to the disc type which acts as fixed orifices, and will move in varied amounts depending on their distance downstream from the fluid source. An air chamber or pocket may be maintained at the top of the deadener which receives flow and provides for further cushioning for the attenuation of surges. In other words, the deadener acts as a variable filter which is adaptable to a wide range of pressures and pulsation levels.

The reeds may be made of any suitable resilient material including spring steel or spring brass. The number of reeds used in any given design would be dependent on the pressures and pressure fluctuations related to its intended use and, in many applications, a single reed design may be practical. In the event that a design with relatively stiff reeds or a plurality of reeds is employed for high pressure use, that same design could be adapted for low pressure use by means of bypasses between some of the upper and lower reed chambers. The bypassing function could be achieved by such means as direct connection of tubing between the chambers.

DESCRIPTION OF THE PREFERRED EMBODIMENT

Figure 1:
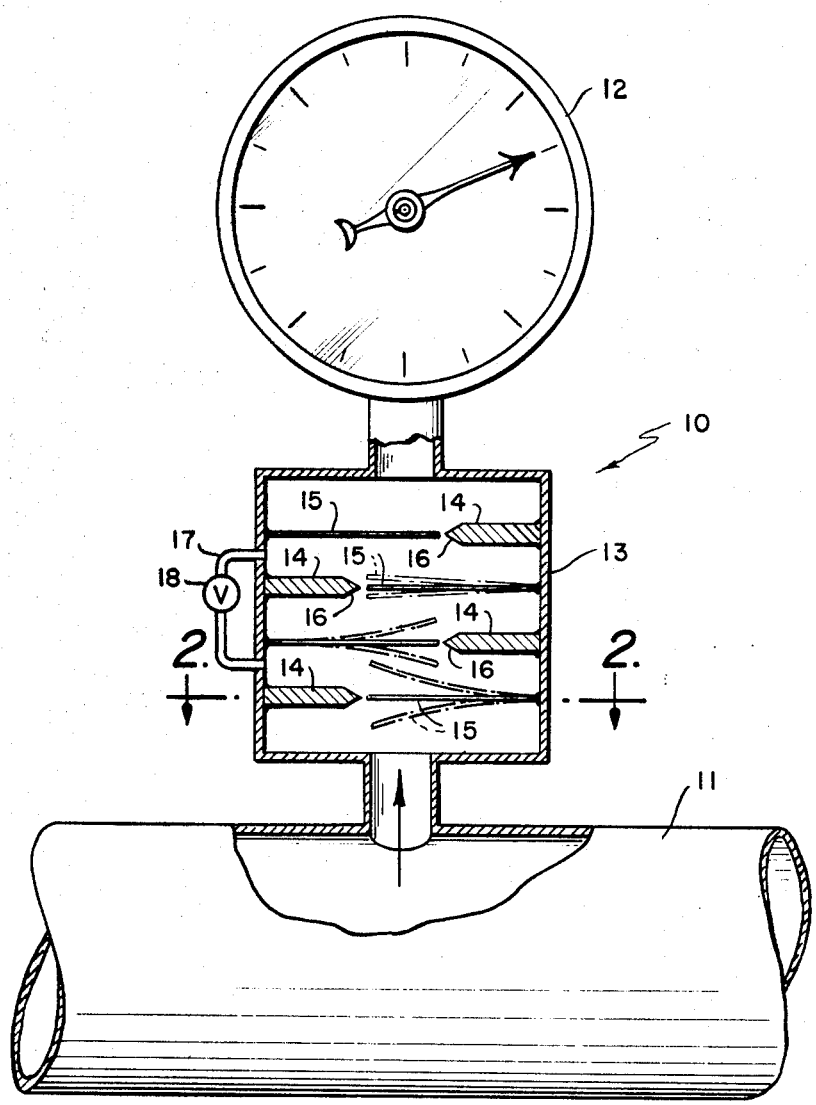
FIG. 1 is a side view of a preferred embodiment of the invention as adapted to a meter and pipe.
Figure 2:
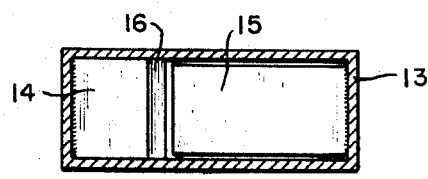
FIG. 2 is a top view of a reed assembly of the type used in FIG. 1.

Referring now to the drawings, there is shown, in FIG. 1, a side view of a deadener 10 constructed according to the teachings of this invention and, in FIG. 2 a top view of a reed and plate used in FIG. 1. The deadener is shown as being attached at one end to a pipe 11 containing a fluid being measured while the other end is attached to meter 12 such as a pressure guage. The mode of attachment may be any suitable and conventional means such as, but not limited to, a weld or a threaded coupling.

The deadener itself includes a housing 13, a single or, as shown, a series of stiff, sharp-edged plates 14, and a single or, as shown, a corresponding series of relatively thin, flexible springs or reeds 15. The housing 13 may be of any suitable shape and can be, as shown, rectangular in all axial planes. This shape is not critical but does provide a convenient design with respect to the reed 15 and plate 14 construction.

Each plate 14 and its corresponding reed 15 are coplanar and substantially perpendicular to the direction of fluid flow through the deadener 10 from the pipe 11 and towards the meter 12. Each plate and its corresponding reed are mounted to extend toward each other from opposing walls of the housing 13 by suitable means such as welding or brazing. The plates 14 may also be attached on their sides to the other two opposing walls of the housing while the reeds are left free on their sides so that they may bend away from their unstressed plane position and the sharp edge 16 of the associated plates 14. The opposing sides to which the plates and reeds are respectively attached may be alternated, as shown.

Under the pressure of the fluid flow the reeds 15 will bend away, as shown, from their associated plates and, in doing so, will enlarge the orifice originally formed by the built-in gap between the plates and reeds in their unstressed condition. In doing so, each reed 15 will absorb some of the energy of the pulsation so that each sequential reed more remote from the fluid input will receive the fluid with a higher degree of "pulse filtering" than the previous reed. Each reed 15, therefore, will bend or deviate from its mean a little less than the one before.

In order to make a given deadener more sensitive, i.e. more effective when operating on fluid flow at lower pressures, a bypass may be formed between the reed and plate sections. The bypass may simply consist of a piece of tubing such as that shown in FIG. 1 as element 17. Valve 18 is provided so that the bypass may easily be made effective, partially effective or ineffective.

Thus, the deadener according to the invention provides improved characteristics for general quieting and for making accurate measurements where the fluid flow being operated upon has random or periodic pulsations. Quieting is accomplished without the addition of any substantial system complexity or size, degradation of reliability or increased cost. It should be understood, of course, that the foregoing disclosure relates only to a preferred embodiment of the invention and that numerous modifications may be made therein.

What I claim is:

1. A fluid pulse attenuating device comprising:
  a housing having an inlet and an outlet to accommodate a fluid stream;
  a plurality of reeds within said housing cantilevered from one side of said housing towards an opposing side of said housing; and
  a plurality of stiff plates extending from the opposing side of said housing toward said reeds, said reeds and associated stiff plates being substantially coplanar, and substantially, but not entirely, blocking the fluid stream.

2. In the fluid pulse attenuation device of claim 1, said housing being rectangular in all axial planes and said stiff plates having a sharp edge on the edge immediately adjacent the reed edge with which it is most closely associated.

3. In the fluid pulse attenuation device of claim 1, wherein a plurality of reeds and corresponding stiff plates are alternatingly connected to different opposing sides of said housing.

4. In the fluid pulse attenuation device of claim 1, said housing having bypass means connected thereto whereby at least one of said plurality of reeds and corresponding stiff plates is made ineffective with respect to its operation on the fluid flowing into said housing.

5. In the fluid pulse attenuation device of claim 4, said bypass means including a conduit and a valve interposed therein.